Oct. 9, 1945. M. L. B. J. CASPERSZ 2,386,658
APPARATUS FOR PRODUCING RADIOGRAPHS
Filed Sept. 30, 1942 3 Sheets-Sheet 2
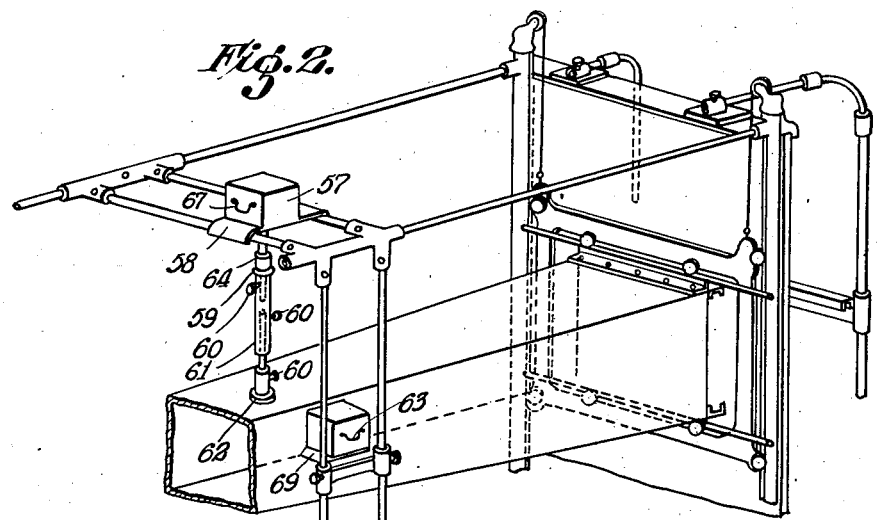
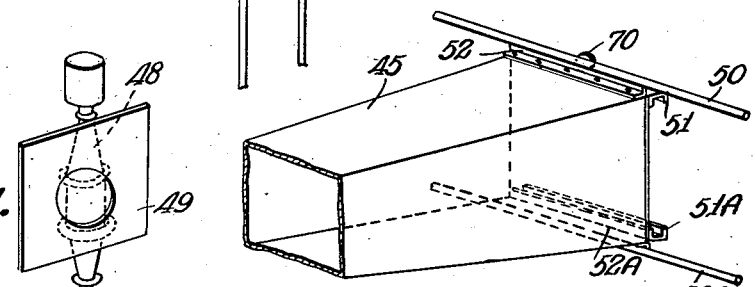
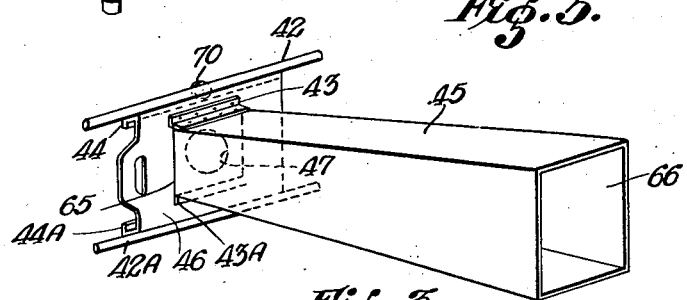
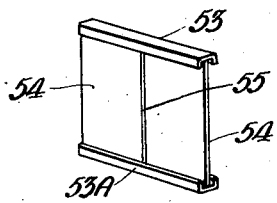
Inventor:
MAURUS LEONARD BARADAT JOSEPH CASPERSZ,
by Glascock Downing & Seibold
Attorney.

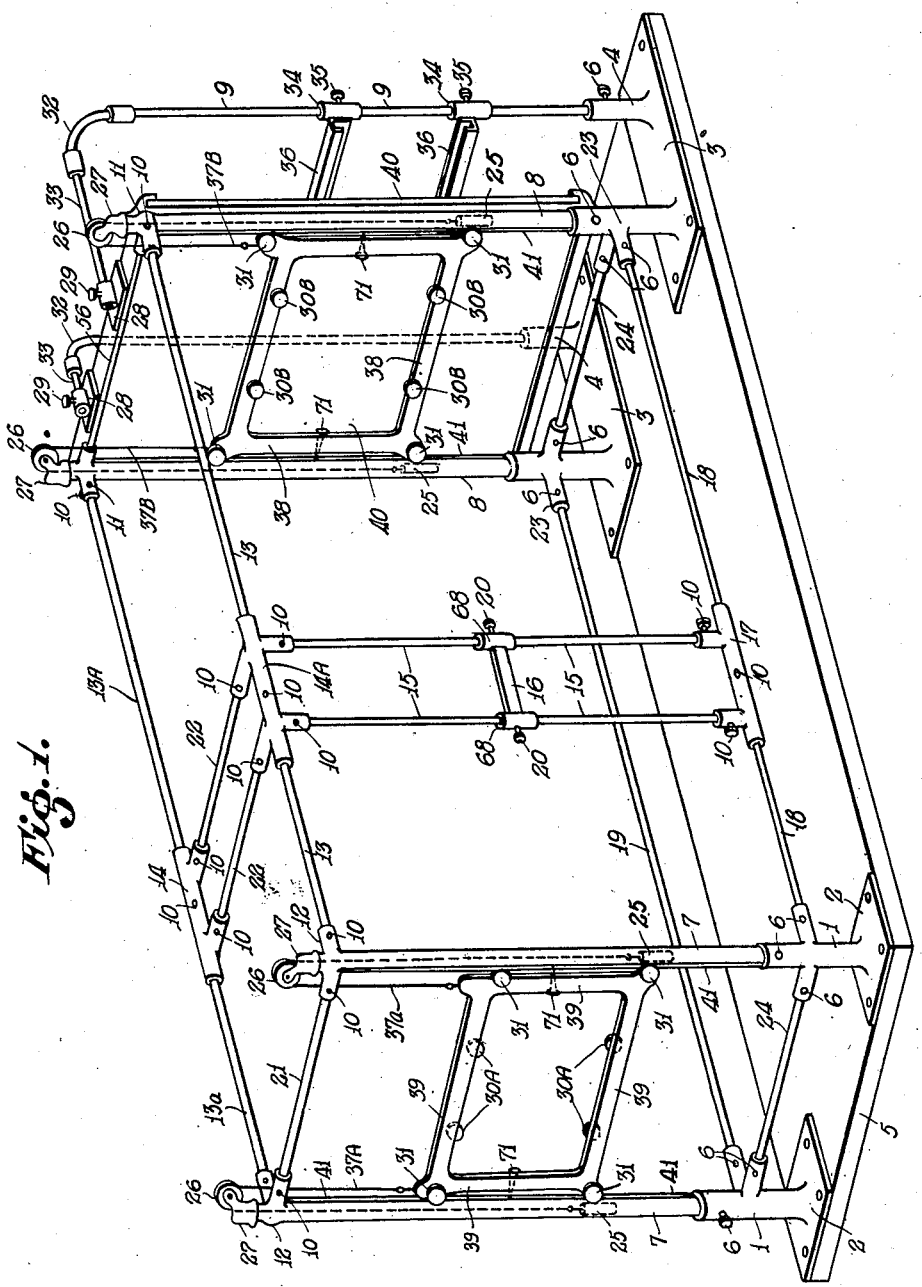

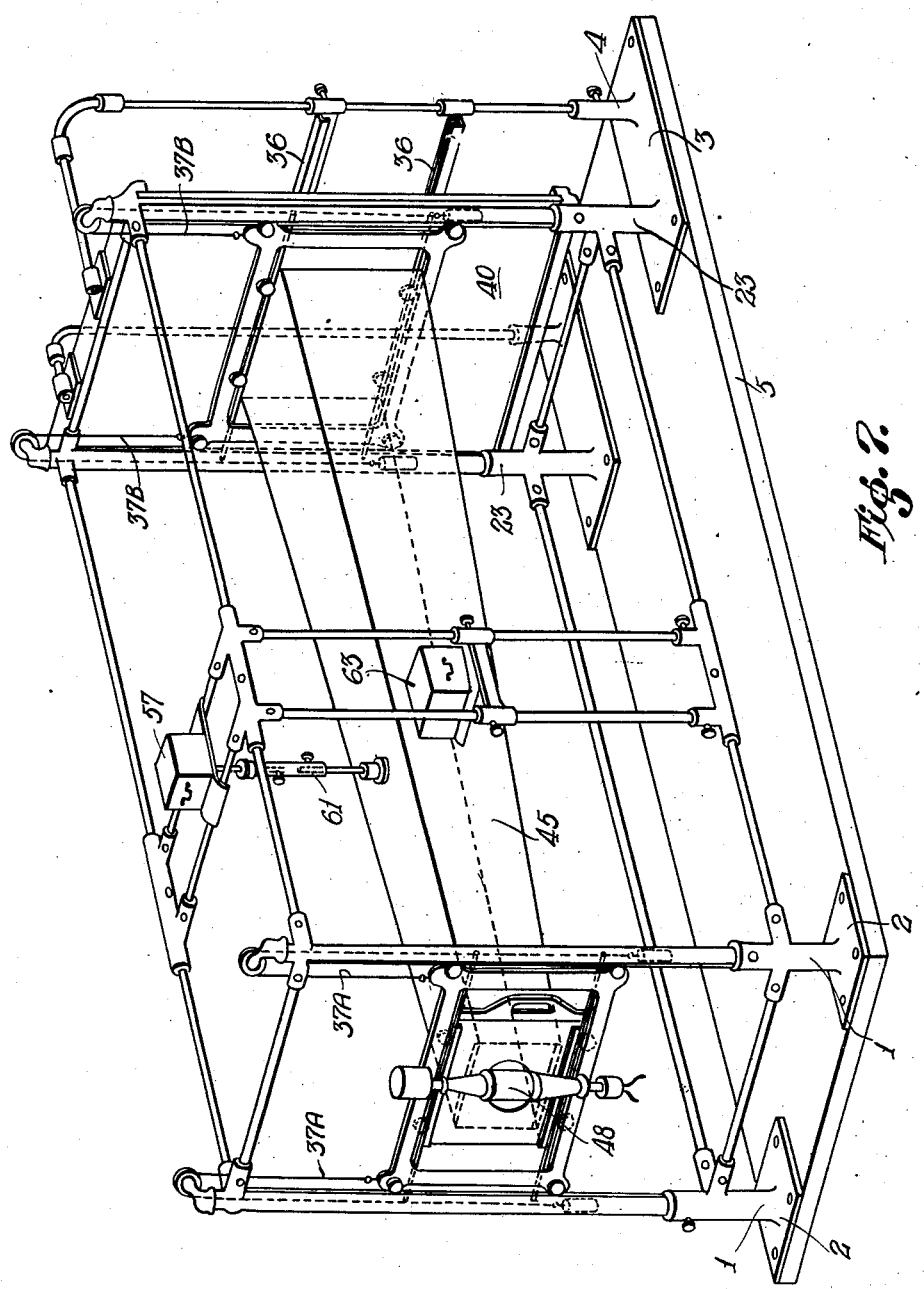

UNITED STATES PATENT OFFICE 2,386,658

APPARATUS FOR PRODUCING RADIOGRAPHS

Maurus Leonard Baradat Joseph Caspersz, Maradana, Colombo, Ceylon

Application September 30, 1942, Serial No. 460,244
In Ceylon September 15, 1941

1 Claim. (Cl. 250—65)

Like other forms of actinic energy, X-rays produce effects on sensitized photographic material, though certain contributory factors introduce differences in the radiographic as allied to photographic records. The essential characteristic which distinguishes it from photographic or other similar records is that of disproportionate magnification of the object examined or otherwise referred to radiologically as radiographic distortion.

If distortion in radiography caused proportionate magnification of the object and the related surrounding objects, its presence would not have been such an objectionable feature. Relative measurements obtained radiographically would then bear a like relation to the actual size of the object and the adjacent objects, as in photography. Unfortunately this ideal does not normally result, whatever the conditions, under existing circumstances. While it is useful in many respects to profit by the magnification in a radiograph affected by distortion, as for example, in demonstrating a very small urinary calculus or an otherwise imperceptible fracture, its presence is a positive disadvantage in such radiological examinations where true size and other correct relative measurements become imperative.

In practical radiography, distortion, which is due to the divergency of the beam of irradiation, is governed by the nature of the object examined and by the ratios relative to the object-focus and object-film distances. These difficulties have to some extent been compromised by employing the technique of obtaining the radiograph with the object as close as possible to the recording surface and the source of irradiation as far as possible from the recording surface, within permissible limits. Distortion, however, continues to exist in the resulting radiograph, though reduced to the practical minimum under the circumstances now obtaining.

Physical principles show, for example, that if the breadth measurements of an object are required, such measurements obtained radiographically will show disproportionate magnification, specially if one breadth limit of the object is in a different plane than the other. It also follows that the radiograph of more than one object at varying object-film distances obtained simultaneously, will show disproportion in the measurements of such objects relative to each other, for the reason that those objects which are closer to the recording surface will show a percentage enlargement which is lesser than those which are further away. There is therefore not only distortion in the measurements of an object taken individually but there also exists relative disproportion when such measurements of more than one object are considered collectively, as for example, in radiographic examinations of the heart relative to the chest or in the determination of the diameters of the foetal skull and the pelvic brim in cases of pregnancy.

Objects which are radiologically examined are usually solids at variable and unknown object-film distances. For instance, the heart of a well-built individual will be at a greater distance from the recording surface than the heart of one whose chest is not so prominent. In the former case the percentage enlargement will be greater than in the latter. It is for reasons connected with the variability of the unknown object-film distances therefore that mathematical determination of the percentage enlargement of an object or objects examined radiologically must remain indeterminate.

With an ability to eliminate radiographic distortion radiographically or compute such distortion mathematically, radiographic records continue to be deceptive and unreliable especially in such examinations where true size and other comparative measurements are indicated.

The purpose of the invention hereunder described is therefore to eliminate simultaneously the factors contributing towards radiographic distortion, whether it be in respect of an individual object or collectively in respect of more than one object radiographed at the same instant, irrespective of the unknown object-film distance, and/or its variability, so that true size and correct comparative measurements in relation to one or more objects can be accurately obtained by direct radiography.

The basis of the principle is that of a moving beam of X-rays which for practical purposes can be considered unidimensional. If such a horizontal beam, for instance, be afforded uniform movement vertically, then the consecutive, sectional radiograph of an object or objects placed between the moving beam and the recording surface would be one in which the vertical measurements would be identical to those of the object itself. Similarly, a vertical beam afforded uniform horizontal movement, would produce a radiograph of the object or objects where the horizontal measurements will be absolutely true. It is obvious therefore that the production of two such radiograms will provide the necessary data.

The invention consists of a radiographic unit the principles embodied in the operation of which constitutes the manner of correcting the factors affecting radiographic distortion and the method for obtaining radiographically true measurements, especially of the heart relative to the chest.

According to the invention a four-sided, hollow, radio-opaque metal shield, each side of which is trapezoidal in cross section, with the shorter sides of the trapezium parallel and the longer sides equally inclined at either base, is utilized to provide an extension to the cone of a standard X-ray tube-cone unit, the dimensions of the shield depending on the perpendicular distance of the X-ray focus to the larger base of the shield, and the maximum length or breadth of recording surface employed.

The outer surface of a flat metal plate with a central aperture, adapts the cone of the X-ray tube so that the aperture of the plate lies symmetrically within the cone. The smaller base of the shield is mounted on the inner surface of the plate so that the aperture is centrally within the base of the shield.

A radio-opaque metal slide, with a central linear slit of negligible width, slides into position within the larger base of the shield along either pair of opposite edges, providing a horizontal or vertical slit, so as to obstruct the emission of any X-radiation except for that which passes through the slit.

The upper and lower horizontal edges of the plate holding in position the X-ray tube-cone unit on one surface and the small base of the radio-opaque shield on the other, are fixed between round rods with sufficient projection of the rods at either end of the plate, to enable the accessory when suitably mounted for movement horizontally to travel a distance slightly greater than the maximum length or breadth of the recording surface employed. The large base of the shield is also mounted between round rods with corresponding projection of the rods on either side of the shield.

The round rods carrying the shield at its smaller base are inserted between suitably dimensioned pairs of grooved rollers fixed on the horizontal sides of a rectangular metal frame, the vertical sides of which move on grooved roller bearings between vertical rails mounted on upright columns on either side.

The round rods carrying the shield at its larger base are similarly inserted between pairs of grooved rollers on the horizontal sides of a corresponding rectangular metal frame, the vertical sides of which also move on grooved roller bearings between vertical rails mounted on upright columns on either side.

Vertical suspension of the whole tube-cone shield accessory is obtained by supporting cables over ball-bearing pulleys atop and connected counter-balanced weights inside the columns at either end.

A thumb screw through the upper round rods at either end of the shield, butting against the upper horizontal side of each frame enables the tube-cone shield unit to be symmetrically positioned between the frames and immobilized against horizontal movement.

Similar thumb screws through the vertical sides of each frame butting against the vertical rails on which the frames move in the vertical plane, locks the tube-cone-shield unit against vertical movement.

The accessory thus mounted and controlled is therefore capable of independent movement vertically or horizontally.

Mechanically operated timers are suitably incorporated in the unit to give the accessory uniform and independent movement vertically or horizontally, in a predetermined time, through a selected distance of travel, which in either case corresponds to the linear measurement of the recording surface used. Signal bells indicate the beginning and end of the selected distance of travel, to enable the operator to energise the tube synchronously for only the required period of time.

The accessory which thus provides a beam of X-rays, through a horizontal slit moving vertically, or through a vertical slit moving horizontally, in either case through a selected distance of travel, in a predetermined time, is separately utilized to obtain sectionally corresponding radiographs of an object placed between either moving beam and the recording surface, the height-adjustable holder for which is situated opposite the large base of the shield, at a distance depending on the focal-film distance recommended.

Several embodiments of the invention will be described by way of example with reference to the accompanying diagrams in which:

Figure 1 is a view of the skeleton structure of the radiographic unit.

Figure 2 is a view showing separate timer units mounted and the manner in which the open end of one of the triggers is connected to the tube-cone shield accessory by telescopic rods.

Figure 3 is a view showing the small base of the radio-opaque shield suitably held in position on a metal plate which is mounted between round rods.

Figure 4 shows the X-ray tube-cone unit mounted on a metal plate.

Figure 5 is a view showing the large base of the radio-opaque shield suitably mounted between round rods.

Figure 6 is a view of a square radio-opaque metal slide with a central linear slit.

Figure 7 is a perspective view of the complete radiographic unit.

Like reference numerals refer to like parts throughout the specification and drawings.

The radiographic unit herein described, referring to Fig. 1, has for its base an electrically non-conducting platform 5 at the corners of which are mounted the bases 2, of support units 1, and the common bases 3, of support units 23 and single vertical supports 4.

Each base 2 accommodates a support unit 1 consisting of a main vertical support centrally positioned on the said base and two component elbow supports which are at right angles to each other and at right angles to the main vertical support.

Each base 3 accommodates a similar support unit 23 and a separate vertical support 4 suitably positioned at the head and foot respectively of their common base. The support units 23 are proximally situated to similar units 1, and each elbow support faces its corresponding member at either end of the platform. These supports are all threaded internally and have suitable pins 6 to enable the connecting members of the structure to be screwed in and pinned rigidly.

Horizontal and cross rods 18, 19, and 24 respectively of the lower frame are screwed in and pinned into the corresponding elbow supports of the support units 1 and 23.

Tubular uprights 7 of suitable bore and height are screwed in and pinned into the vertical supports of the support units 1. Tubular uprights 8 of suitable bore and height are screwed in and pinned into the vertical supports of the support units 23. Tubular uprights 9 are screwed in and pinned into the vertical supports 4.

The four main tubular uprights 7 and 8 have at their upper ends right angled studs 27 on each of which a pulley 26 mounted on a ball race is fixed. The respective pulleys 26 on the respective uprights 7 and 8 face each other inwards.

Just below the studs 27 on the uprights 7 are two component elbow supports 12 forming a unit with each upright 7 at this position in such a manner that they are at right angles to each other and at right angles to the uprights 7.

At similar positions on each tubular upright 8 is a single elbow support 11, forming a unit with each upright 8 at this position in such a manner that the elbow support 11 is at right angles to the upright 8.

These elbow supports have suitably positioned thumb screws 10, are threaded internally, and face their corresponding members at either end.

Into the elbow supports 12 and 11 respectively are screwed in and pinned the horizontal rods 13, 13A and the corresponding cross rod 21 of the upper frame. Referring to the construction shown in Fig. 2, a flat metal strap 56 completing the upper frame is rigidly connected to the uprights 8 at positions just below the studs 27.

On the flat metal strap 56 are rigidly fixed the bases of two raised sockets 28 suitably spaced between each other. These sockets 28 are threaded internally and are provided with suitably positioned pins 29 to enable short tubular rods 33 fitted into them horizontally to be screwed in and pinned.

The tubular uprights 9 mounted into the single vertical supports 4 take the corresponding vertical sockets 34 of each of two grooved runners 36, at the ends of which are the said vertical sockets 34 on which are suitably positioned thumb screws 35.

These runners are freely movable along the vertical uprights to permit the radiographic cassette which slides laterally between them to be immobilized at any desired height by engaging the thumb screws 35 provided on the terminal sockets of the said runners.

Suitable bends 32 connect the open ends of the vertical tubular uprights 9 and the open ends of the short tubular rods 33 fitted into the raised sockets 28.

A leaning board 40 made of non-radio-opaque material is fitted vertically under the flat metal strap 56 and flush on the surfaces of the uprights 8, the surfaces referred to being those proximal to the uprights 9.

A single arm double projected binding tube 17 the projections of which are threaded and provided with thumb screws 10, fits into the horizontal rod 18 of the lower frame.

Into the corresponding upper horizontal rod 13 fits a double arm double projected binding tube 14A, the projections of which are threaded and provided with thumb screws 10.

Into the other horizontal rod 13A of the upper frame fits a single arm double projected binding tube 14, the projections of which are threaded and provided with thumb screws 10.

The uprights 15 which are screwed in and pinned to the projections of the single arm double projected binding tube 17 of the lower horizontal rod 18, and the relative projections of the double arm double projected binding tube 14A of the upper horizontal rod 13, take the corresponding vertical socket terminal 68 of a tie strap 16 on which is mounted a metal base 69. The said metal base mounted on the tie strap 16 is freely movable along the uprights 15 and is immobilized at any desired height employing the thumb screw 20.

Two other horizontal rods 22 are screwed in and pinned to connect the remaining projections of the double arm double projected binding tube 14A and the projections of the single arm double projected fitting 14.

Centrally positioned on these horizontal rods 22 is a flat horizontal metal base 58 with an aperture (Fig. 2) rigidly fixed in this position.

On this metal base 58 is mounted a mechanically operated timer unit consisting of a trigger 64 operating through the aperture in an oil bath container 57. On the trigger itself at a short distance proximal to its free end is mounted a control 59 for regulating its speed. The trigger is automatically locked when pulled out to its full available length, until released by a manually operated control 67.

A signal bell inside the container 57 indicates the instant when the moving trigger has attained a uniform speed, that is to say, after it has been allowed to travel a short distance before engaging the said signal bell. A second signal bell also situated inside the container 57, is actuated by the moving trigger before finally coming to rest. The required distance, for the purpose of this invention, is made to correspond to the distance of travel between the rings of the initial and final signal bells. The trigger is so arranged that when pulled out vertically it has its free end within the inside of the structure.

A similar timer unit 63 (Fig. 2) is fixed on the metal base 69 fitted on the movable tie-strap 16 (Fig. 1). In this case the trigger when pulled out horizontally has its free end also within the inside of the structure.

The inner sides of each main tubular upright 7, 8 is rail mounted up to its whole available length.

A rectangular metal frame unit 39, to the corners of which are fixed grooved roller bearings 31 enabling it to move vertically between rails, fit into the rails 41 mounted on the inner sides of the uprights 7.

A rectangular metal frame 38, similarly provided with grooved roller bearings 31, fit between the rails 41 mounted on the inner sides of the uprights 8.

Two grooved rollers 30, at a distance between each other are mounted on each inner horizontal side of the said rectangular metal frame 39, 38.

Further according to the invention there is provided a four-sided, hollow, radio-opaque metal shield 45 (Fig. 3) each side of which is trapezoidal in cross section, the shorter sides of the trapezium being parallel and the longer sides being equally inclined at each base. The said shield, the dimensions of which depend on the recommended perpendicular distance from the X-ray tube focus to the large base of the shield and the maximum length or breadth of the recording surface employed, fits between the rectangular metal frames 38 and 39 in the following manner:

Angle cleats 43 suitably pinned to the upper and lower sides of the smaller base 65 (Fig. 3) of the shield 45, hold this base on one surface of a flat metal plate 46 having a central aperture 47, the said aperture being situated within the base 65 of the shield 45. The upper and lower horizontal edges of the plate 46 are fixed between two round rods 42 of suitable lengths. On the other flat surface of this metal plate 46 are provided upper and lower grooved runners 44 between which slides the metal plate 49 (Fig. 4) of the mounted X-ray tube-cone unit 48. There is also provided a central aperture on this plate 49 and lock-nuts in both grooved runners 44 to lock the plate when its aperture is centrally against the aperture 47 facing it.

Angle cleats 52 suitably pinned to the upper and lower sides of the large base 66 of the shield 45, hold the said base between round rods 50 of suitable lengths.

The said round rods 42 and 50 project sufficiently on either side of the shield to enable the tube-cone-shield unit when mounted for movement horizontally to travel a distance slightly greater than the maximum length or breadth of the recording surface employed.

Grooved runners 51 (Fig. 5) project sufficiently from the upper and lower surfaces of the base 66 to enable a square radio-opaque metal slide 54 (Fig. 6), provided with sliding edges 53, and a central linear slit 55 of negligible width, to slide into position centrally within the base 66 as to render it ray-proof except for the irradiation which passes through the said slit. Lock nuts in both grooved runners 51 lock the slide 54 when the foregoing requirements have been satisfied. A vertical or horizontal slit is obtained by inserting the same slide 54 separately through the grooved runners 51 along either pair of opposite edges of the slide 54.

In this connection it may be stated that alternative methods of providing a vertical or horizontal slit at the large base of the radio-opaque shield may replace the said metal slide, as for example, a built-in diaphragm arrangement, the leaves of which are operable independently to provide a vertical or horizontal linear slit of negligible width.

The round rods 42 (Fig. 3) carrying the shield at its smaller base are inserted between the respective pairs of rollers 30 fixed on the horizontal sides of the metal frame 39 mounted between the vertical rails 41 of the uprights 7. The round rods 50 carrying the shield at its larger base (Fig. 5) are similarly inserted between the respective pairs of rollers 30 fixed on the metal frame 38 mounted between the rails 41 of the uprights 8.

Vertical suspension is obtained by suitable cables 37A connecting the upper ends of the rectangular metal frame 39 and similar cables 37B connecting the upper ends of the rectangular metal frame 38, with the cables atop the respective pairs of pulleys 26. These cables terminate inside the respective tubular uprights 7 and 8 in counter-balanced weights 25.

Thumb screws 70 through the upper round rods 42 (Fig. 3) and 50 (Fig. 5) butting against the upper horizontal sides of the rectangular metal frames 39 and 38 respectively, immobilize the tube-cone-shield unit (Fig. 7) against horizontal movement. Similar thumb screws 71 through the vertical sides of each frame 39 and 38 butting against the respective vertical rails 41 immobilize the tube-cone-shield unit in its vertical movement. The accessory thus mounted is therefore provided with independent movement either vertically or horizontally.

On the uppermost side of the shield 45, proximal to the vertical timer 57 at a point which is the balancing-centre of the tube-cone-shield accessory, is provided a collar on a base 62 with a thumb screw 60 (Fig. 2). A similar collar on a base and thumb screw are provided at a similar position on the vertical side of the shield proximal to the horizontal trigger of the timer unit 63.

A telescopic rod 61 provided with thumb screws 60 as shown in Fig. 2, connects the free end of the trigger 64 at one end and the open end of the collar 62 at the other, while the three thumb screws 60 make all the connections rigid. Similar connections are made when it is proposed to connect the trigger of the timer unit 63 and the corresponding collar on the vertical side of the shield.

When it is desired to afford the tube-cone-shield unit vertical movement, the accessory is first locked symmetrically between the frames 38, 39 by engaging the appropriate thumb screws 70, provided to prevent its horizontal movement. The desired vertical heights at which the accessory should begin operating is then adjusted and the collar 60 on the uppermost side of the shield 45 and the free end of the appropriate trigger 64 are connected by the telescopic rod 61. The control 67 releasing the trigger 64 is actuated and the required vertical movement is obtained.

Similarly when it is desired to afford the tube-cone-shield unit horizontal movement, the unit is locked against vertical movement utilizing the thumb screws 71 after adjusting the height at which the accessory should operate. The timer 63 movable along the vertical rods 15 is adjusted to the corresponding height and immobilized in this position by the thumb screws 20 provided. The free end of the trigger and the collar mounted on the vertical side of the shield are connected by the telescopic rod 61. The manually operated control for releasing the trigger is disengaged and the tube-cone-shield accessory is afforded horizontal movement.

It is to be understood that to afford the tube-cone-shield accessory the desired uniform movement horizontally or vertically, the arrangement of the trigger operating in the oil-bath container is optional. Electrical, mechanical, clockwork or other means, may be used instead, so long as the prerequisite conditions associated with either movement of the tube-cone-shield accessory are faithfully fulfilled.

According to the invention there is therefore provided a beam of X-rays passing through either a horizontal or vertical slit of negligible width, the former operating vertically while the latter operates horizontally, at a predetermined distance from the source of irradiation. Eeither beam of rays which is afforded uniform movement through a selected distance of travel in a predetermined time, is separately utilized to obtain sectionally corresponding radiographs of an object, placed between the moving beam and the recording surface, in the following manner:

*Using the horizontal slit*

(a) The tube-cone-shield unit is adjusted to the vertical height at which it should operate and is locked symmetrically in this position against horizontal movement.

(b) The part to be radiographed is placed as near as possible to the recording surface and is fluoroscopically positioned centrally within the area that will be occupied by the recording surface.

(c) The vertical trigger of the appropriate timer is pulled out and the time of travel set on the calibrated control utilizing the formula:

$$T = \frac{t \times 1}{w}$$

where T is the required time of travel, $t$ the exposure time to produce a normal radiograph of the same part, 1 the distance of travel of the trigger corresponding to the length of recording surface employed and $w$ the width of the beam of X-rays utilized.

*Note.*—It may be mentioned that the value of T in seconds which is the sum total of the consecutive exposures of the part sectionally irradiated, is independent of the exposure time of X-radiation received by that given part. As a whole, the part radiographed receives the identical exposure time $t$ which would otherwise be given to produce the radiograph under already existing conditions. The dangers associated with increased times of irradiation is therefore absolutely nil.

(d) The recording surface is then placed in position and the manually operated control releasing the trigger is actuated. Simultaneously with the ring of the initial signal bell and for the whole interval of time between the rings of the initial and final signal bells, the X-ray tube is synchronously energised and the radiogram is obtained.

*Using the vertical slit*

The vertical slit is similarly used to take a radiogram of the object giving the accessory horizontal movement, having immobilized the tube-cone-shield accessory against vertical movement.

I claim:

Radiant energy control apparatus comprising a source of radiant energy, a hollow radio opaque shield having one end fitted over said energy source and forming an extension thereof, a radio opaque diaphragm located in the opposite end of said shield and having a slot threin, said diaphragm being adjustable to dispose the slot horizontally, or vertically, and means to impart vertical or horizontal movement to the shield, energy source and diaphragm as a unit through a selected distance in a predetermined time whereby a beam of radiant energy passing through the horizontally disposed slot may be moved vertically and a beam of radiant energy passing through the vertically disposed slot may be moved horizontally to produce two radiographs in one of which the horizontal measurements and in the other of which the vertical measurements of an object are accurate.

MAURUS LEONARD BARADAT JOSEPH CASPERSZ.